United States Patent
Kolls (10) Patent No.: US 11,144,927 B1
(45) Date of Patent: Oct. 12, 2021

(54) INTELLIGENT AUTHORIZATION SYSTEM

(71) Applicant: Wells Fargo Bank, N.A., San Francisco, CA (US)

(72) Inventor: H. Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 554 days.

(21) Appl. No.: 15/470,845

(22) Filed: Mar. 27, 2017

(51) Int. Cl.
*G06Q 20/40* (2012.01)
*G06Q 40/02* (2012.01)

(52) U.S. Cl.
CPC ....... *G06Q 20/4016* (2013.01); *G06Q 40/025* (2013.01)

(58) Field of Classification Search
CPC .................................................. G06Q 20/4016
USPC ......................................................... 705/38
See application file for complete search history.

(56) References Cited

U.S. PATENT DOCUMENTS

| | | | |
|---|---|---|---|
| 7,930,244 B2 | 4/2011 | Zarin et al. | |
| 8,682,785 B2 | 3/2014 | Ghosh et al. | |
| 2002/0138418 A1* | 9/2002 | Zarin | G06Q 20/10 705/38 |
| 2003/0182229 A1* | 9/2003 | Siegel | G06Q 20/10 705/39 |
| 2005/0250538 A1 | 11/2005 | Narasimhan et al. | |
| 2006/0005024 A1 | 1/2006 | Law | |
| 2007/0061362 A1* | 3/2007 | Rodriguez | B05D 5/061 |
| 2008/0015979 A1 | 1/2008 | Bentley | |
| 2008/0255986 A1 | 10/2008 | Scarborough et al. | |
| 2012/0054095 A1* | 3/2012 | Lesandro | G06Q 20/10 705/39 |
| 2015/0058220 A1* | 2/2015 | Cazanas | G06Q 20/40 705/44 |

FOREIGN PATENT DOCUMENTS

WO WO-2011/063432 A2 5/2011

* cited by examiner

*Primary Examiner* — Jessica Lemieux
(74) *Attorney, Agent, or Firm* — Foley & Lardner LLP (57) ABSTRACT

A financial institution computing system includes a network circuit enabling the financial institution computing system to exchange information over a network, a customer database storing financial information for a plurality of customers, and a transaction circuit. The transaction circuit is configured to receive a transaction request containing authentication information, the transaction request being created by a third party computing system associated with a third party, and pre-authorize the transaction request using information stored in the customer database. The pre-authorization includes determining that the authentication information matches information of the customer stored in the customer database, determining at least one characteristic of the customer, generating, responsive to the authentication information matching the information of the customer stored in the customer database, an intelligent authorization approval code based on the determined characteristic, and transmitting, over the network via the network circuit, the intelligent authorization approval code to the third party computing system.

17 Claims, 6 Drawing Sheets

INTELLIGENT AUTHORIZATION SYSTEM

BACKGROUND

In traditional pre-authorization processes, a payment card issuer may perform various fraud checks and determine if an account associated with a customer has sufficient funds to engage in a transaction. If the account has sufficient funds and there is no indication that the transaction is fraudulent, the payment card issuer may transmit a message to a card processor or merchant. The message typically consists of a code that uniquely identifies the transaction and indicates that the transaction has been approved or declined. Typically, however, the code does not contain any other information concerning the customer.

SUMMARY

One embodiment relates to a financial institution computing system. The financial institution computing system includes a network circuit enabling the financial institution computing system to exchange information over a network. The financial institution computing system also includes a customer database storing financial information for a plurality of customers. The financial institution computing system also includes a transaction circuit. The transaction circuit is configured to receive, over the network via the network circuit, a transaction request containing authentication information, the transaction request being created by a third party computing system associated with a third party. The transaction circuit is also configured to conduct a pre-authorize process. The pre-authorization process includes determining that the authentication information matches information of the customer stored in the customer database. The pre-authorization process also includes determining at least one characteristic of the customer based on the information of the customer stored in the customer database. The pre-authorization process also includes generating, responsive to the authentication information matching information of the customer stored in the customer database, an intelligent authorization approval code based on the determined characteristic. The intelligent authorization approval code including (i) a first portion indicating the transaction request being either approved or denied and (ii) a second portion encoded with the at least one characteristic of the customer. The pre-authorization process also includes transmitting, over the network via the network circuit to a merchant computing system, the intelligent authorization approval code.

Another embodiment relates to a method for authorizing a transaction request. The method includes receiving, over a network via a network circuit, a transaction request containing authentication information, the transaction request created by a third party computing system associated with a third party. The method also includes conducting a pre-authorization process, by a transaction circuit of a financial institution computing system. The pre-authorization process includes determining, by the transaction circuit, that the authentication information matches information of the customer stored in a customer database associated with the financial institution computing system. The pre-authorization process also includes determining, by the transaction circuit, at least one characteristic of the customer based on the information of the customer stored in the customer database. The pre-authorization process also includes generating, by the transaction circuit, responsive to the authentication information matching the information of the customer stored in the customer database, an intelligent authorization approval code based on the determined characteristic. The intelligent authorization approval code is indicative of the transaction request being pre-approved and the at least one characteristic of the customer. The pre-authorization process also includes transmitting, by the transaction circuit, over the network via the network circuit to a merchant computing system, the intelligent authorization approval code to the third party computing system.

Another embodiment relates to a merchant computing system. The merchant computing system includes a network circuit enabling the computing system to exchange information over a network. The merchant computing system also includes a processing circuit configured to receive, over the network via the network circuit, an approval message for a transaction request of a customer from a computing system of a financial institution, the approval message containing an intelligent authorization approval code. A portion of the intelligent authorization approval code is encoded with at least one characteristic of the customer. The processing circuit is further configured to decode the intelligent authorization approval code to determine the at least one customer characteristic. The processing circuit is further configured to transmit a depiction of the at least one characteristic to a computing device associated with the customer.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where providing any type of information concerning customers in authorization communications for various transactions may be useful.

Embodiments of systems and methods for authorizing a transaction request by transmitting an intelligent authorization approval code disclosed are discussed herein. A financial institution computing system receives a transaction request identifying a financial account associated with a customer. The transaction request may have been generated, for example, by a merchant computing system of a brickand-mortar merchant location or a merchant computing system implementing a merchant website responsive to the customer indicating a preference to engage in a transaction via the merchant website. The financial institution computing system then generates an intelligent authorization approval code and transmits the intelligent authorization approval code to the merchant computing system. The intelligent authorization approval code signifies that the customer is authorized to or not authorized to use the financial account to engage in the transaction, and also includes a portion that provides information to the merchant that is applicable to the customer. As a result, the intelligent authorization approval code informs the merchant about the customer, which enables the merchant to personalize the customer's experience at the brick-and-mortar location or via a personalized customer website interface. While the code returned to the merchant is frequently referred to herein as an approval code, it will be appreciated that a code returned to a merchant could also signify that the preapproval request is denied.

The embodiments and implementations of the systems and methods disclosed herein improve current transaction authorization systems by adding functionality to traditional authorization codes. By using portions of the authorization code to inform merchants about customer, the systems and methods disclosed herein enable merchants to enhance the shopping experience of customers. For example, the intelligent authorization approval code may identify a level of credit that the customer is pre-approved for by a financial institution. This enables the merchant to display this content on a customer web interface next to items that the customer seeks to purchase or make personalized offers to the customer above a price threshold knowing that the customer has credit to make the purchase. furthermore, the customer is also aware that they have bee pre-approved by the financial institution for enough credit to purchase an item. As such, the systems, methods, and computer implementations disclosed herein improve current transaction methods by providing functionalities that are novel and non-obvious improvements over current systems.

Figure 1:
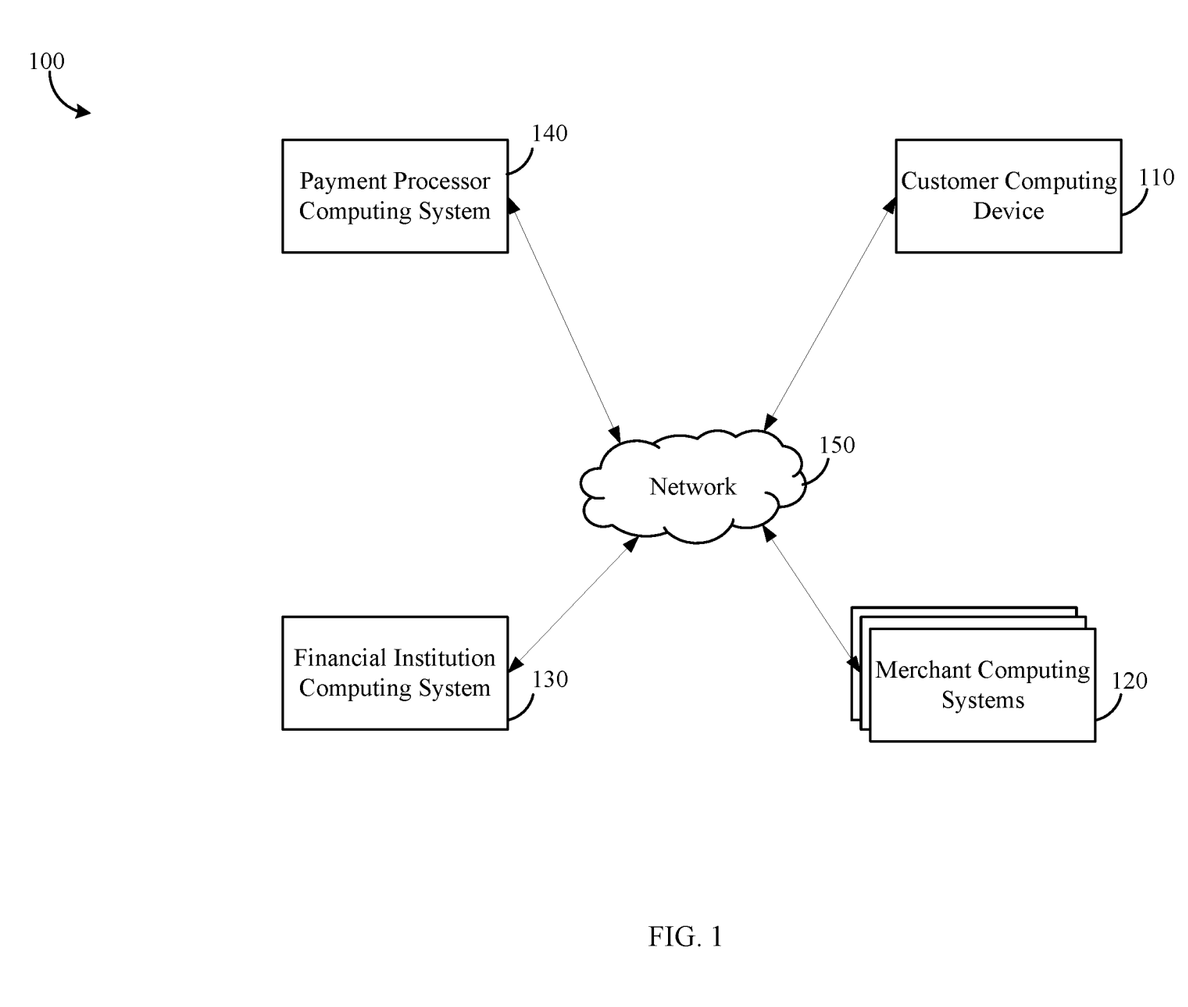
FIG. 1 is a block diagram illustrating an intelligent authorization system, according to an example embodiment.

Referring now to FIG. 1, an intelligent authorization system 100 is shown according to an example embodiment. As described in further detail herein, the intelligent authorization system 100 facilitates communications between a merchant, a customer, and a financial institution. The intelligent authorization system 100 includes a customer computing device 110 associated with a customer, merchant computing systems 120 associated with a plurality of merchants, a financial institution computing system 130 associated with a financial institution, and a payment processor computing system 140 associated with a payment processor. Various components of the intelligent authorization system 100 may be configured to communicate with each other over the network 150. For example, a customer may use the customer computing device 110 to transmit communications to a merchant computing system 120 over the network 150 to initiate a transaction with a merchant associated with the merchant computing system 120. The network 150 is a data exchange medium, which may include wireless networks (e.g., cellular networks, Bluetooth®, WiFi, Zigbee®), wired networks (e.g., Ethernet, DSL, cable, fiber-based), or a combination thereof. In some embodiments, the network 150 includes the internet.

In operation, the customer inputs information into the customer computing device 110 while the customer computing device 110 is communicatively coupled to the merchant computing system 120 over the network 150 (e.g., while the customer computing device 110 is implementing a merchant website run by the merchant computing system 120). The information input by the customer may include, for example, information that identifies a product that the customer wishes to purchase from the merchant, and information that identifies a payment account associated with a financial institution. To authorize payment for the identified product using the payment account, the merchant computing system 120 may be configured to transmit a transaction request for an authorization amount (e.g., $100) including the payment account identifying information to the payment processor computing system 140, which may in turn transmit the transaction request to the financial institution computing system 130 associated with the financial institution.

The financial institution computing system 130 performs various fraud or account balance checks to determine whether the customer is authorized for the authorization amount. If these checks are satisfied, the financial institution computing system 130 then sends an authorization message to the payment processor that transmits the authorization message to the merchant computing system 120. The authorization message may include an authorization code. The authorization code indicates that the customer is either pre-authorized for the authorization amount or not authorized for the authorization amount (e.g., by declining the card). Having received the authorization code, the merchant computing system 120 may be configured to allow the customer to complete the initiated transaction. The specific amount for the customer transaction may be deducted from the customer payment account at a later time during, for example, a batch settlement between the financial institution and the merchant. The authorization codes included in a traditional arrangement generally contain little additional information concerning the customer (e.g., a traditional authorization code may be a randomly generated number).

In the intelligent authorization system 100, however, the financial institution computing system 130 is configured to generate an intelligent authorization approval code. The intelligent authorization approval code contains at least one portion that is not randomly generated. For example, in the intelligent authorization system 100, there may be an arrangement between the merchant and the financial institution whereby the financial institution transmits information to the merchant. The information may, for example, include tabular datasets describing various qualifications of the customer (e.g., levels of credit, financial rewards, membership status, and so on). The financial institution computing system 130 may be configured to generate an intelligent authorization approval code that contains a portion that identifies the transmitted information (e.g., the particular qualifications described in the tabular datasets) that is applicable to the customer. As a result, when the merchant computing system 120 receives the intelligent authorization approval code, the merchant computing system 120 becomes aware of the financial qualifications of the customer or other information regarding the customer. This gives the merchant the ability to, for example, personalize a merchant website interface viewable by the customer on the customer computing device 110.

The customer computing device 110 is a computing system associated with a customer of one or more financial accounts at the financial institution. The customer computing device 110 includes one or more processors and non-transitory storage mediums housing one or more logics configured to enable the customer computing device 110 to exchange data over the network, execute software applications, access websites, generate graphical customer interfaces, and perform other operations. Examples of the customer computing device 110 include a personal computer such as a desktop or laptop computer, smartphones, tablets, wearable computing devices such as smartwatches, and the like. The customer computing device 110 may be configured to enable the customer to communicate information (e.g., transaction information) to merchant computing system 120.

The merchant computing systems 120 are computing systems associated with merchants with whom the customer seeks to transact. In some arrangements, the merchant computing system 120 includes a backend server system configured to operate a network marketplace (e.g., an online website) enabling customers to engage in transactions with the merchant over the network 150. It should be noted that the term "merchant" is used herein for exemplary purposes only. The systems and methods disclosed herein are compatible with any situation in which customers seek to transact with any type of entity.

In some arrangements, the merchant computing systems 120 are communicatively engaged with the customer computing device 110 and present displays on the customer computing device 110 that enable the customer to input information to request products or services from the entity associated with the merchant computing system 120. Information communicated from the customer computing device 110 to the merchant computing system 120 may include, for example, product identifying information, customer identifying information, and information identifying a payment account associated with the financial institution. In some arrangements, the merchant computing systems 120 are configured to receive information from the customer computing device 110 and create a transaction request that is transmitted to the financial institution computing system 130 (e.g., through the payment processor computing system 140). The transaction request may be a request for the financial institution computing system 130 to preauthorize (e.g., before a transaction between the customer and the third party is completed) a charge for an authorization amount from the payment account of the customer. The preauthorization amount may be based on an amount of a pending transaction between the customer and the third party.

The payment processor computing system 140 is a computing system associated with a payment processor. The payment processor may have agreements with various merchants associated with the merchant computing system 120 to perform payment processing services. In some arrangements, the payment processor computing system 140 is associated with a card network. Examples of card networks include Visa®, MasterCard®, etc. The payment processor computing system 140 performs various operations to authorize customer payments. For example, the payment processor computing system 140 may receive financial account identifying information from the merchant computing system 120 and transfer that information to the financial institution for authorization.

The financial institution computing system 130 is a computing system at a financial institution that is capable of maintaining customer accounts (e.g., payment card accounts) and databases of customer information. The financial institution may include commercial or private banks, credit unions, investment brokerages, or the like. In response to a received transaction request, the financial institution computing system 130 may be configured to authenticate the customer using information contained in the transaction request and authorize the transaction request (e.g., determining whether the identified financial account contains sufficient funds). The financial institution computing system 130 may be configured to transmit a message back to the merchant computing system 120 (e.g., through the payment processor computing system 140) including an intelligent authorization approval code that indicates that the customer is either authorized or not authorized for the authorization amount and informs the merchant computing system 120 about other aspects of the financial profile of the customer.

Figure 2:
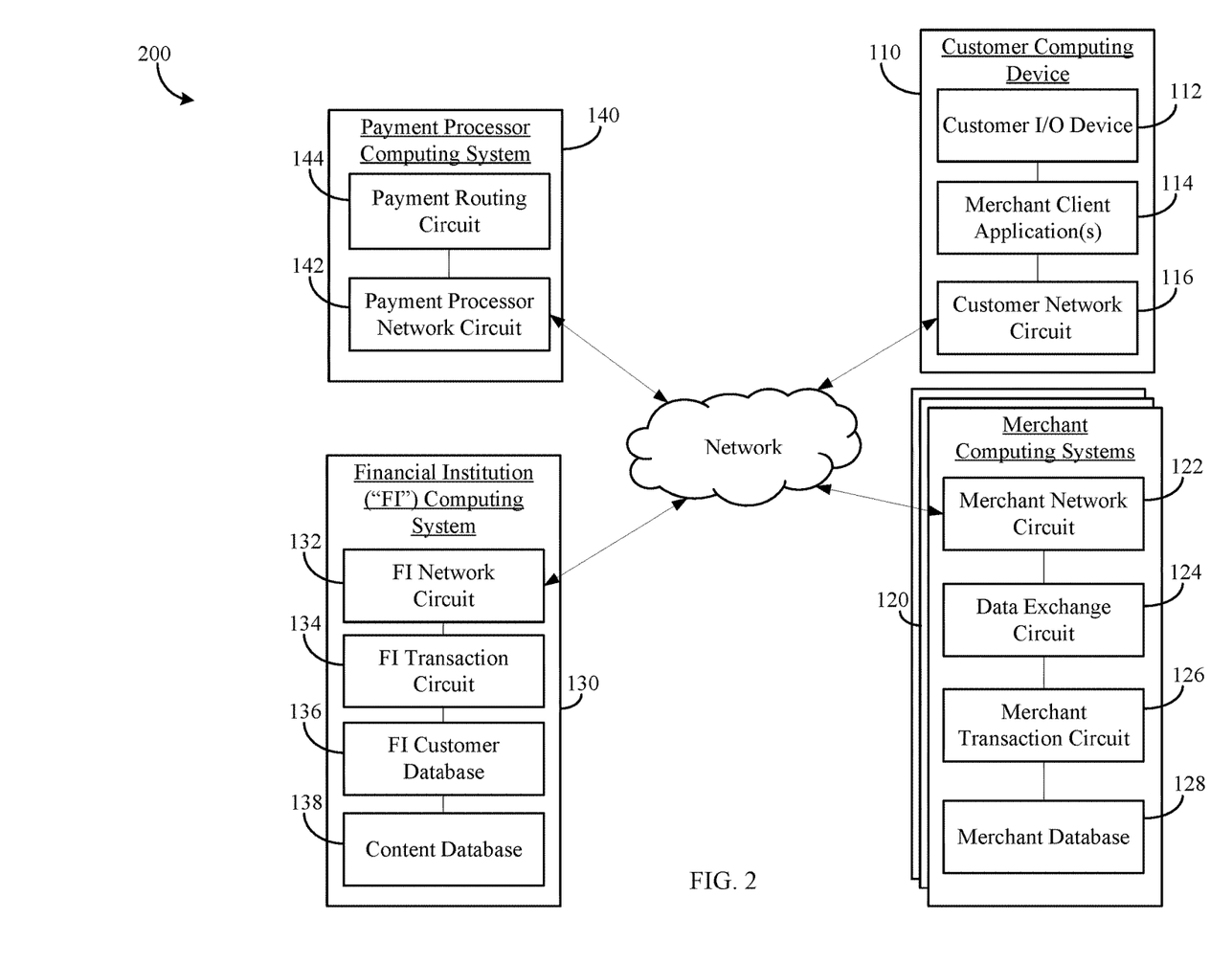
FIG. 2 is a block diagram illustrating an example embodiment of the intelligent authorization system shown in FIG. 1.

Referring now to FIG. 2, an intelligent authorization system 200 is shown as a more detailed embodiment of the intelligent authorization system 100. The intelligent authorization system 200 includes example embodiments of the customer computing device 110, the merchant computing systems 120, the financial institution computing system 130, and the payment processor computing system 140, and the network 150 of FIG. 1.

In the system 200, the customer computing device 110 includes a customer network circuit 112 enabling the customer computing device 110 to exchange data over the network 150, a merchant client application 114, and a customer input/output ("I/O") device 116. The customer I/O device 116 includes hardware and associated logics configured to enable the customer computing device 110 to exchange information with a customer. An input aspect of the customer I/O device 116 allows the customer to provide information to the customer computing device 110 and may include, for example, a mechanical keyboard, a touchscreen, a microphone, a camera, a fingerprint scanner, any customer input device engageable to the customer computing device 110 via a USB, serial cable, Ethernet cable, and so on. An output aspect of the customer I/O device 116 allows the customer to receive information from the customer computing device 110, and may include, for example, a digital display, a speaker, illuminating icons, LEDs, and so on. The customer I/O device 116 may be configured to include assemblies that serve both input and output functions, allowing the financial institution computing system 130 and the merchant computing systems 120 to exchange information with the customer computing device 110. Such assemblies include, for example, radio frequency transceivers (e.g., RF or NFC-based transceivers) and other short range wireless transceivers (e.g., Bluetooth®, laser-based data transmitters).

The merchant client application 114 is communicably coupled to merchant computing system 120 (e.g., the merchant network circuit 122, the data exchange circuit 124, the merchant transaction circuit 126, or the merchant database 128) and is structured to permit the customer to engage in transactions with the merchants associated with the merchant computing systems 120. In some embodiments, the merchant client application 114 is a separate software application implemented on the customer computing device 110. The merchant client application 114 may be downloaded by the customer computing device 110, hard coded into the memory of the customer computing device 110, or be a web-based interface application such that the merchant client application 114 may provide a web browser to the application, which may be executed remotely from the customer computing device 110. In the latter instance, the customer may have to log onto or access the web-based interface before usage of the application. Further, and in this regard, the merchant client application 114 may be supported by a separate computing system including one or more servers, processors, network circuits, and so on, that transmit applications for use to the customer computing device 110. In certain embodiments, the merchant client application 114 includes an application programming interface (API) and/or a software development kit (SDK) that facilitates the integration of other applications with the merchant client application 114. In some embodiments, the customer computing device 110 includes multiple merchant client applications 114 associated with multiple merchants.

Irrespective of the form that the merchant client application 114 takes, the merchant client application 114 is structured to provide displays to the customer computing device 110 that enable the customer to input information concerning prospective transactions between the customer and the merchant. Displays may present the customer, for example, with various products or services offered by the merchant. Each product or service displayed may be selectable by the customer. Responsive to the customer selecting a displayed product, the merchant client application 114 may be further configured to provide displays that enable the customer to input payment information (e.g., information concerning a payment account held by the customer at the financial institution). In some arrangements, the merchant client application 114 presents displays enabling the customer to manage an account that that the customer has at an online marketplace run by the merchant computing system 120. Account managing displays may enable the customer, for example, to input financial account information, customer biographical information (e.g., contact information), and shipping preferences. In some embodiments, the displays presented to the customer may also include content based on an intelligent authorization approval code received by the merchant computing system 120 from the financial institution computing system 130, as described herein.

The merchant computing system 120 includes a merchant network circuit 122 enabling the merchant computing system 120 to exchange data over the network, a merchant data exchange circuit 124, a merchant transaction circuit 126, and a merchant database 128. The merchant database 128 is configured to store and maintain information relating to a merchant's wares in an online marketplace. The merchant database 128 can include information such as available product inventory, price information, good or service details, customer information, customer payment information, and so on.

In some arrangements, the merchant database 128 is also configured to store customer account information. Customer account information may include, for example, customer identifying information, customer login information (e.g., usernames, passwords, and the like), customer account preferences (e.g., addresses, payment methods), and customer history information (e.g., transaction histories). In some arrangements, as described herein, the customer account information also includes data transmitted to the merchant computing system 120 from the financial institution. Data transmitted by the financial institution computing system 130 may include, for example, intelligent authorization approval codes and associated content. In some arrangements, intelligent authorization approval codes received from the financial institution computing system 130 identify portions of the associated content that are applicable to the customer. In some arrangements, the associated content received from the financial institution computing system 130 includes information pertaining to a financial profile of the customer. In some arrangements, the associated content received from the financial institution computing system 130 includes web content that the merchant computing system 120 (e.g., through the data exchange circuit 124) may use to update the displays presented to the customer on the customer computing device 110 through the merchant client application 114.

The merchant data exchange circuit 124 is configured to send and receive merchant information over the network 150 via the merchant network circuit 122, and to store and retrieve merchant information in the merchant database 128. In some arrangements, the merchant data exchange circuit 124 is configured to maintain an online marketplace by, for example, updating the content and functionality available on the merchant client application 114 on the customer computing device 110. For example, the data exchange circuit 124 may be configured to update the displays viewable on the customer computing device 110 when the customer computing device 110 implements the merchant client application 114. In some arrangements, the merchant data exchange circuit 124 is communicatively coupled with a database (e.g., the content database 138) associated with the financial institution computing system 130 such that the data exchange circuit 124 may use content stored in the content database 138 to update the displays viewable on the customer computing device 110 when the customer computing device 110 implements the merchant client application 114.

The merchant transaction circuit 126 is configured to receive transaction information (e.g., product selections, payment account information, and the like) input by the customer on the customer computing device 110, and assemble corresponding transaction requests. The merchant transaction circuit 126 determines a total transaction amount for a payment transaction (e.g., total price of specified products and/or services, including sales tax, and other fees), bundles the total with the transaction information to make a transaction request, and transmits the transaction request to the financial institution computing system 130 over the network 150 via the merchant network circuit 122. In some arrangements, the transaction request generated by the merchant transaction circuit 126 includes a preauthorization request for a preauthorization amount. For example, to check the validity of the payment credentials received from the customer computing device 110, the merchant transaction circuit 126 may transmit an authorization request to the payment processor computing system 140 over the network 150 via the merchant network circuit 122, which may in turn transmit the authorization request to the financial institution computing system 130. In some arrangements, the authorization amount of the authorization request is for a trigger amount. As described herein, responsive to receiving an authorization request for the trigger amount, the financial institution computing system 130 may be configured to generate an intelligent authorization approval code for the customer.

The financial institution computing system 130 includes a financial institution network circuit 132 enabling the financial institution computing system 130 to exchange data over the network 150, a financial institution transaction circuit 134, a content database 138, and a financial institution customer database 136. The customer database 136 allows the financial institution computing system 130 to retrievably store customer information relating to the various operations discussed herein, and may include non-transient data storage mediums (e.g., local disc or flash-based hard drives, local network 150 servers, and the like) or remote data storage facilities (e.g., cloud servers).

In some arrangements, the customer database 136 includes personal customer information (e.g., names, addresses, phone numbers, and so on), identification information (e.g., driver's license numbers, standard biometric data, and so on), and customer financial information (e.g., account numbers, account balances, available credit, credit history, transaction histories, and so on).

The content database 138 is configured to store content descriptive of various customers holding accounts at the financial institution. The content database 138 may include non-transient data storage mediums (e.g., local disc or flash-based hard drives, local network servers, and the like) or remote data storage facilities (e.g., cloud servers). In some arrangements, the content database 138 includes a series of datasets that can be used to categorize various customers. These datasets may include, for example, a series of lookup tables that identify customer qualifications for various levels of credit. For example, in one embodiment, the content database 138 includes a series of lookup tables, with each lookup table associated with a different type of loan (e.g., home loan, lines of credit, cash advances, and installment payments). Each lookup table may include various levels corresponding to different loan amounts that customers may qualify for. Each lookup table may be stored in the content database 138 in association with a lookup table identifier. The lookup table identifier may include a symbol or a sequence of symbols that uniquely identifies the lookup table associated with the lookup table identifier. Similarly, each level in each lookup table may be associated with a level identifier. In some arrangements, the content database 138 also stores lookup tables identifying different customer categories. For example, lookup tables describing customer membership status with the financial institution, customer account balance thresholds, customer financial reward thresholds (e.g., value of customer reward "points" earned through using a payment account at the financial institution), and other examples may also be included in the account database. As described herein, the intelligent authorization approval codes may be structured to identify a particular lookup table and lookup table level applicable to a particular customer.

In some arrangements, the content database 138 stores web content. Web content may include, for example, graphical images, documents, text, and web links. The web content stored in the content database 138 may include information (e.g., in the form of icons, text, and the like) that describe either existing customer relationships with the financial institution (e.g., membership status, account balance information, and financial rewards) or potential transactions that customers may engage in with the financial institution (e.g., loans, lines of credit, and creation of accounts). In some arrangements, the content database 138 includes lookup tables that include various levels that include unique web links (e.g., a hyperlink to access particular web content stored in a server system). The unique web links, when selected, may lead to the web content that can be used by the merchant computing system 120 to update displays presented to the customer via the merchant client application 114. Thus, the intelligent authorization approval codes described herein, by identifying a particular web link applicable to a customer, enable the merchant computing system 120 to deliver individually-tailored financial content to customers. In some arrangements, the web links included in the content database 138 are structured to be presented to customers via the merchant client application 114 on the customer computing device 110. For example, the web links may be configured to, when selected by the customer, present the customer with an application interface for various products (e.g., loans or credit cards) offered by the financial institution. To illustrate, if the financial institution, using methods described herein, determines that a particular customer is qualified for a particular loan (e.g., by pre-approving the customer for the loan), the web link may be configured to present the customer with an application for the particular loan upon the customer selecting the link.

The financial institution transaction circuit 134 is configured to process customer authorization requests. The financial institution transaction circuit 134 may receive an authorization request containing customer authentication information from the merchant computing system 120 over the network 150 via the financial institution network circuit 132. In one aspect, the financial institution transaction circuit 134 authenticates the customer using authentication information included in the transaction request by comparing the authentication information to information stored in the customer database 136. If known information matches the information in the transaction request, the financial institution transaction circuit 134 may authenticate the transaction request. In some embodiments, the financial institution transaction circuit 134 may be configured to request additional authentication information from the customer (e.g., a PIN, answers to one or more security questions).

In some embodiments, the financial institution transaction circuit 134 may perform one or more fraud checks to authorize an authorization request. In addition, the financial institution transaction circuit 134 may determine whether the authorization request may properly be completed by, for example, determining whether the account specified in the authorization request contains sufficient funds to cover the authorization amount. In one embodiment, if the authorization request passes a plurality of fraud checks and the underlying transaction may properly be completed, the financial institution transaction circuit 134 authorizes the authorization request by sending an authorization message to the merchant computing system 120 or the payment processor computing system 140 over the network 150. In some arrangements, the authorization message includes an authorization approval code.

In the system 200, the payment processor computing system 140 includes a payment processor network circuit 142 enabling the payment processor computing system 140 to exchange data over the network, and a payment routing circuit 144. Transaction or preauthorization requests received by the payment processor network circuit 142 are communicated to the payment routing circuit 144. In some arrangements, the payment routing circuit 144 is configured to identify the financial institution associated with received transaction request and to transmit the received information to the financial institution for further processing. It should be noted that, in various embodiments of the systems and methods disclosed here, the payment processor may perform any of the functions discussed herein with reference to the financial institution computing system.

Figure 3:
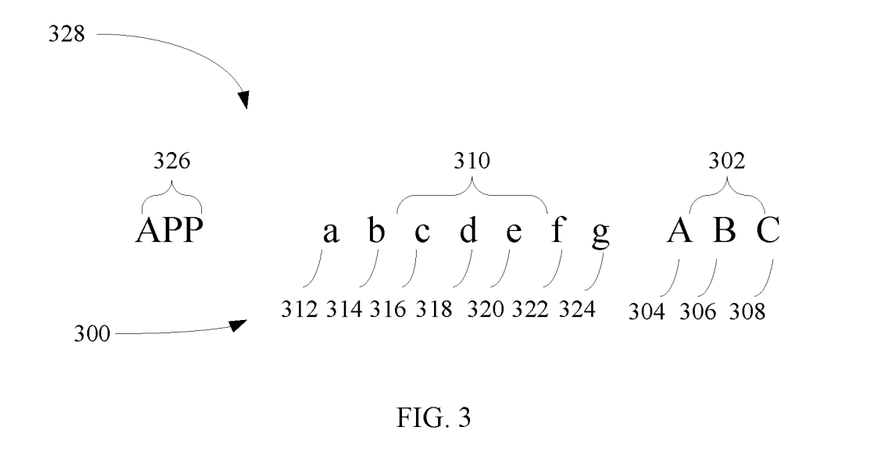
FIG. 3 is an example depiction of an approval code.

Turning now to FIG. 3, an example authorization approval code 300 generated by the FI transaction circuit 134 is shown according to an example embodiment. The authorization approval code 300 may be generated based at least in part on the fraud checks completed by the FI transaction circuit 134. For example, the authorization approval code 300 may include a first portion 302 that indicates whether any customer address information or card verification values (CVVs) included in the transaction request match information stored in the customer database 136. For example, a first value 304 in the first portion 302 may indicate whether a customer zip code included in the transaction request matches a stored zip code for the customer in the database, while a second value 306 in the first portion 302 may indicate whether a numerical street address included in the transaction request matches a stored address, while a third value 308 in the first portion 302 may indicate whether a CVV included in the transaction request matches a third value. In some arrangements, the authorization code may include a second portion 310 that uniquely identifies the transaction request. The second portion 310 may include a series of randomly generated alphanumerical symbols 312, 314, 316, 318, 320, 322 and 324. The FI transaction circuit 134 may then package the authorization approval code 300 with an approval indication 326 that indicates that the transaction is approved to form an approval message 328, though it will be appreciated that the approval indication 326 may alternatively indicate that the transaction is denied. The approval message 328 may be transmitted to the merchant computing system 120 or the payment processor computing system 140 over the network 150.

In some arrangements, the authorization approval code 300 is generated in a different manner. For example, in authorizing the transaction request, the FI transaction circuit 134 may be configured to determine whether the authorization amount included in a received authorization request matches a triggering amount. The triggering amount may be stored, for example, in the memory of the financial institution computing system 130, and be a predetermined amount established by an agreement between the financial institution and the merchant. The FI transaction circuit 134 may be configured to compare the authorization amount to the triggering amount. In some arrangements, responsive to the authorization amount corresponding to the triggering amount, the FI transaction circuit 134 is configured to generate an intelligent authorization approval code.

Figure 4:
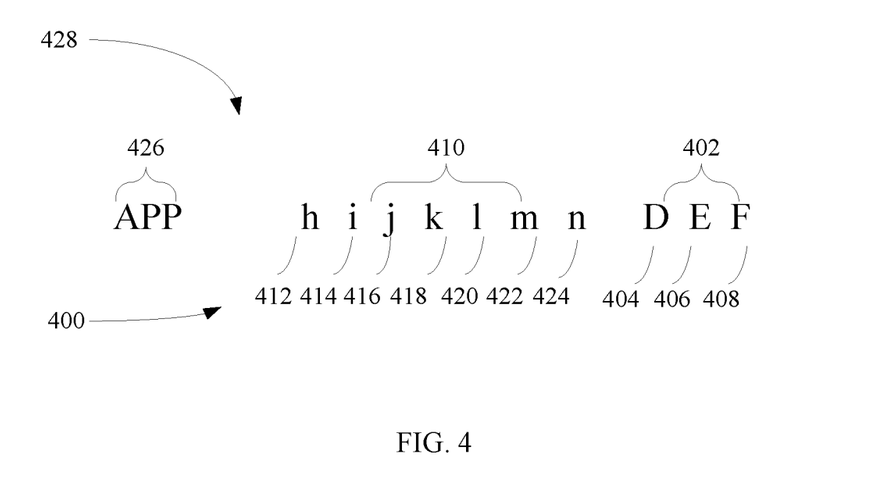
FIG. 4 is an example depiction of an intelligent approval code produced by the intelligent authorization systems disclosed herein.

Turning to FIG. 4, an exemplary intelligent authorization approval code 400 is shown according to an example embodiment. As shown, the intelligent authorization approval code 400 takes a similar form to the authorization approval code 300 shown in FIG. 3, and includes a first portion 402 containing a first digit 404, a second digit 406, and a third digit 408 that convey similar information to the corresponding digits 304, 306, and 308 discussed above in relation to FIG. 3. Similar to the approval message 328 discussed above in relation to FIG. 3, approval message 428 also includes also a second portion 410 uniquely identifying the transaction request, as well as an approval indication 426, though it will be appreciated that the approval indication 426 could alternatively indicate that the transaction is denied. In the authorization code 400, however, the second portion 410 may not be randomly generated. For example, at least one of the symbols 412, 414, 416, 418, 420, 422 in the second portion 402 may be associated with content stored in the content database 138.

In this regard, the FI transaction circuit 134 may be configured to identify content stored in the content database 138 applicable to the customer associated with the financial account identified in the received transaction request. For example, the FI transaction circuit 134 may be configured to retrieve information stored in the customer database 136 associated with the identified payment account and perform various operations on the retrieved information to identify applicable content. As discussed above, the content stored in the content database 138 may include a series of lookup tables including different levels of credit that the customer may qualify for. Accordingly, in some arrangements, the FI transaction circuit 134 is configured to assess the retrieved customer information (e.g., customer credit history, customer income information, customer account balance information, and the like) against predetermined parameters to determine the levels of credit that the customer is qualified for. In some arrangements, the determination includes identifying a lookup table identifier (e.g., representing a particular lookup table storing information pertaining to a particular type of credit) as well as a level identifier (e.g., that represents the terms, such as interest and principal, that the customer is qualified for) that is applicable to the customer. In some arrangements the FI transaction circuit 134 is further configured to generate the second portion 402 of the intelligent authorization approval code based on the identified content. For example, at least one of the symbols 412, 414, 416, 418, 420, and 422 in the second portion 410 of the intelligent authorization approval code 400 may indicate a portion of the content (e.g., a particular table level in a particular lookup table) applicable to the customer. In some arrangements, the particular symbol in the second portion 410 of the intelligent authorization approval code 400 that indicates a particular portion of the content stored in the content database 138 applicable to the customer is determined by a pre-configured code-generating scheme stored in the memory of the financial institution computing system 130.

Figure 5:
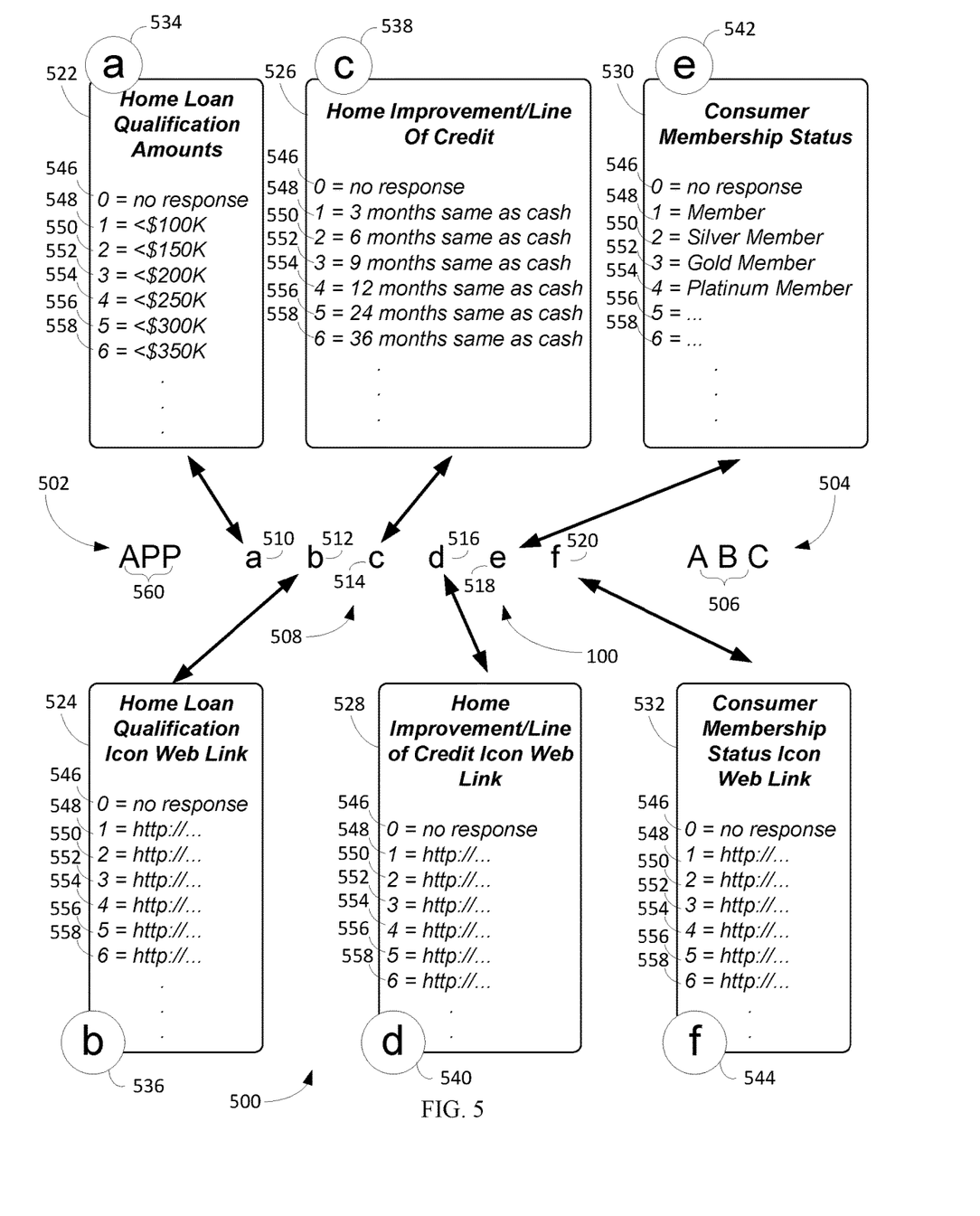
FIG. 5 is a schematic for a code-generating scheme for an intelligent approval code, according to an example embodiment.

Referring now to FIG. 5, an exemplary intelligent authorization approval code-generating scheme 500 is shown according to an example embodiment. As shown, the code-generating scheme produces an authorization approval message 502 that includes an authorization approval code 504 and an approval signifier 560. The authorization approval code 504 includes a first portion 506 containing symbols performing similar functions as the first portion 302 of the authorization code 300 discussed above in relation to FIG. 3. The authorization approval code 504 also includes a second portion 508 including symbols 510-520 that are ordered in accordance with the code-generating scheme 500. In the code-generating scheme 500, the second portion 508 includes a first symbol 510, a second symbol 512, a third symbol 514, a fourth symbol 516, a fifth symbol 518, and a sixth symbol 520. The code-generating scheme 500 also includes a first lookup table 522, a second lookup table 524, a third lookup table 526, a fourth lookup table 528, a fifth lookup table 530, and a sixth lookup table 532. Each lookup table has a corresponding lookup table identifier 534, 536, 538, 540, 542, and 544. Further, each of the lookup tables includes various lookup table level indicators 546, 548, 550, 552, 554, 556, and 558 that indicate which level is applicable to the customer. As shown in the code-generating scheme 500, the position of each symbol in the second portion 508 of the intelligent authorization approval code 504 corresponds to a different lookup table identifier 534, 536, 538, 540, 542, and 544. The first symbol 510 in the second portion 508 corresponds to the lookup table identifier 534 associated with a first lookup table 522. In some arrangements, the identity that the first symbol 510 has indicates the lookup table level in the first lookup table 522 that is applicable to the customer. For example, if the first symbol 510 of the second portion 506 has a value of "6," it indicates that the lookup table level 558 in the first lookup table 522 is applicable to the customer (e.g., the customer qualifies for a $350,000 home loan from the financial institution). Further, the identity that the second symbol 512 of the second portion 508 has may indicate the lookup table level in the second lookup table 524 that is applicable to the customer, and so on.

According to the code-generating scheme 500, an example intelligent authorization approval code 504 having a second portion 508 with the symbols "632524" (e.g., a first symbol 510 having the value of "6", a second symbol 512 value having the value of "3", and so on) indicates that the lookup table level 558 in the first lookup table is applicable to the customer. As shown, this would indicate that the customer is qualified to receive a $350,000 home loan from the financial institution. Thus, in operation according to this particular example, the FI transaction circuit 134 is configured to retrieve customer financial information from the customer database 136 and assess relevant customer information (e.g., credit history, income information, account balance information, and the like) to determine which lookup table level 546-558 in the first lookup table 522 is applicable to the customer (e.g., determine which particular home loan, if any, that the particular customer qualifies for).

In some arrangements, only a portion of the second portion 508 (e.g., only the first symbol 510) of the intelligent authorization approval code 502 identifies content in the content database 138 applicable to the customer. In some arrangements, multiple symbols (e.g., the second symbol 512, third symbol 514, fourth symbol 516, fifth symbol 518, and sixth symbol 518) also identify additional content in the content database 138 applicable to the customer. Accordingly, the FI transaction circuit 134 may be configured to perform a similar sequence discussed above with respect to the first symbol 510 for the third symbol 512 (e.g., so as to determine a line of credit that the customer is qualified to receive) and the fifth symbol 518 (e.g., so as to determine a membership status applicable to the customer).

In some embodiments, the intelligent authorization approval code instructs the merchant computing system 120 which particular lookup tables to retrieve data from. For example, the code generation scheme may identify a null value. Referring to an example in which the code-generating scheme 500 is used, the null value may be "0." Under such scheme, if a particular symbol 510-520 in the second portion 508 has the value "0", the merchant computing system 120 does not retrieve information from the lookup table associated with that particular symbol. To illustrate, if the second portion 508 is "000200", the merchant computing system 120 in response only retrieves information from the lookup table level 550 of the fourth lookup table 528.

In some arrangements, the code-generating scheme is transmitted to the merchant computing system 120 by the financial institution computing system 130 along with any content or information that is encoded into the intelligent authorization approval codes. As such, the merchant computing system 120, by comparing a received intelligent authorization approval code to the coding scheme, is able to acquire knowledge about the customer. For instance, in a particular example where only the first symbol 510 of the second portion 508 is used to identify information regarding the customer, a code generating scheme indicating that the first symbol 510 encodes the customer information as well as a lookup table enabling the merchant computing system 120 to decode the code may be transmitted to the merchant computing system 120. Thus, the merchant computing system 120 is aware of the applicable level of the lookup table based on the value of the first symbol.

In some arrangements, the content database 138 also includes lookup tables including various web links to web content that can be incorporated into the code-generating scheme. As shown in FIG. 5, the code-generating scheme 500 includes a second lookup table 524, a fourth lookup table 528, and a sixth lookup table 532 that include lookup table levels 546-558 associated with various web links. The web links may lead to web content (e.g., graphic images, icons, and the logic) that is also stored in the content database 138 or elsewhere (e.g., at a third party server system). In some arrangements, the web content may depict the information indicated by the first lookup table 522 (e.g., home loan qualification status), the third lookup table 526 (e.g., line of credit qualification status, and the fifth lookup table 530 (e.g., customer membership status). Turning back to the illustrative example discussed above, the second portion of the intelligent authorization approval code had a value of "632524." This indicates that the fourth lookup table level 552 of the second lookup table 524 is applicable to the customer. As shown, second lookup table 522 includes web links to web content associated with the information shown in the first lookup table 522. Thus, in this example, selection of the web link at the third lookup table level 552 of the second lookup table 524 leads to web content that demonstrates that the customer is qualified for a $350,000 home loan from the financial institution. The web content may include, for example, a financial institution logo, as well as graphical depiction of the loan terms that the customer is qualified for. As shown, the fourth lookup table 528 similarly includes web links to web content associated with the information shown in the third lookup table 526, and the sixth lookup table 544 similarly includes web links to web content associated with the fifth lookup table 530.

As discussed above, in some arrangements, the content stored in the content database 138 is accessible by the merchant, and may be stored in the merchant computing system 120 (e.g., in the merchant database 128). Thus, upon receipt of an approval message generated by the FI transaction circuit 134 containing an intelligent approval code 502 generated using the code-generation scheme 500, the merchant computing system 120 is aware of customer financial institution credit approvals (e.g., as indicated by the first symbol 510 and the third 514 symbol of the second portion 508 of the intelligent authorization approval code 504) and customer membership status with the financial institution (e.g., as indicated by the fifth symbol 518 of the second portion 508 of the intelligent preauthorization approval code 504). The merchant may use this information to customize the displays presented to the customer by the merchant client application 114 on the customer computing device 110. Additionally, the intelligent approval code 504 also informs the merchant about web content (e.g., by the web links indicated by the second symbol 512, fourth symbol 516, and sixth symbol 520 of the second portion 508 of the intelligent approval code 504) is most applicable to the customer. In some arrangements, the merchant has access to the web content identified by the intelligent authorization approval code 504, and can use the web content (e.g., that is created or pre-selected by the financial institution) to update an online marketplace run by the merchant computing system 120.

It should be noted that other code-generating schemes are envisioned. In some arrangements, for example, groupings of symbols may relate to a single lookup table identifier. Put differently, each lookup table may have a grouping of lookup table identifiers, with each lookup table identifier having a different sequence of symbols. To illustrate, a particular lookup table may be stored in association with lookup table identifiers "abc," "bac," "cab," and "cba" in the content database 138. If a particular intelligent authorization approval code includes one of the lookup table identifiers, for example, it is indicative that the lookup table is applicable to the customer. Further, each of the lookup table identifiers associated with the lookup table may be associated with a particular lookup table level. Thus, in this example, if an intelligent authorization approval code includes the sequence "abc," the intelligent authorization approval code indicates both the lookup table and lookup table level applicable to the customer. By using this particular scheme, only a single lookup table may be used in the code-generating scheme. If, for example, six symbols were used for each lookup table identifier, many combinations of lookup table identifiers (e.g., seven hundred twenty) corresponding to various levels in the lookup table are possible. Any code-generating scheme that enables the intelligent authorization approval code to be decoded by the recipient to reveal information concerning the customer may be used in accordance with the methods disclosed herein.

Figure 6:
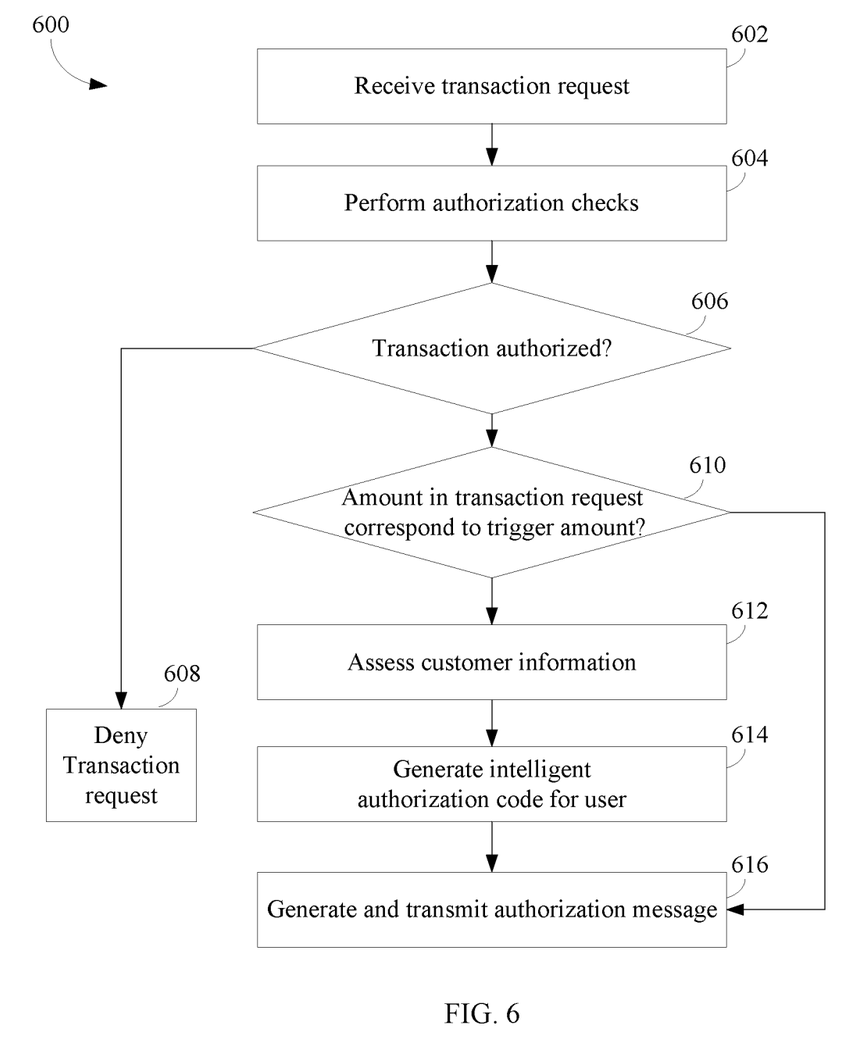
FIG. 6 is a flowchart of a method of authorizing a transaction request, according to an example embodiment.

Referring now to FIG. 6, a flowchart of a method 600 of authorizing payment transactions is shown according to an example embodiment. The method 600 may be performed by processing and storage hardware on a financial institution computing system 130, as executed by one or more logics comprising one or more software applications configured to perform the functions described below.

At 602, a transaction request is received. In some arrangements, the transaction request is received by the FI transaction circuit 134, over the network 150 via the network circuit 132. In various embodiments, the transaction request includes payment credentials and authentication information corresponding to an authorized customer of a financial account. The transaction request is created at the merchant computing system 120 after receiving a request to conduct a transaction from a customer (e.g., from the customer computing device 110 implementing the merchant client application 114). The merchant computing system 120 creates the transaction request using the transaction information (e.g., including characteristics of the transaction request such as merchant information, and a transaction amount), and transmits the transaction request over the network 150 to the payment processor computing system 140, which may in turn transmit the transaction request to the financial institution computing system.

At 604, authorization checks are performed. The FI transaction circuit 134 may authorize the transaction request after performing one or more checks to determine that the transaction request was not fraudulently made and that the underlying transaction may otherwise be properly completed. In one embodiment, the FI transaction circuit 134 cooperates with the customer database 136 to determine whether the financial account contains sufficient funds to complete the transaction request. Additionally, the FI transaction circuit 134 also cooperates with the account database to determine whether any customer authentication information included in the transaction request (e.g., customer address information, and CVV number) matches information associated with the payment account stored in the account database.

At 606, it is determined if the transaction is authorized. In some arrangements, if the FI transaction circuit 134 finds that no fraud indicators are present and that the transaction request may properly be made, the FI transaction circuit 134 may initiate a sequence to produce an authorization message including an authorization code and move on to 610. Alternatively, if the FI transaction circuit 134 finds one or more fraud indicators, and/or that the transaction request cannot be properly made, the FI transaction circuit 134 may deny the transaction request by transmitting a denial message to the merchant computing system 120 or payment processor computing system 140 at 608.

At 610, it is determined if the received transaction request includes an authorization amount that corresponds to a triggering amount. In some embodiments, an arrangement between the merchant and the financial institution associated with the financial institution computing system 130 defines circumstances in which the financial institution is to transmit an intelligent authorization approval code to the merchant.

In some embodiments, an intelligent authorization approval code is transmitted by the financial institution in response to receiving a transaction request including a triggering amount. Accordingly, the FI transaction circuit 134 may be configured to determine whether the authorization amount contained in the received transaction request corresponds to the triggering amount. If the authorization amount does not correspond to the triggering amount, the FI transaction circuit 134 may be configured to move to step 612, described herein, and generate a traditional authorization approval message (e.g., containing a randomly generated authorization code) to be transmitted to the merchant computing system 120 or the payment processor computing system 150.

At 612, customer information is assessed. In some arrangements, responsive to the authorization amount included in the transaction request corresponding to the triggering amount, the FI transaction circuit 134 is configured to cooperate with the customer database 136 and perform various operations on the information stored in the account database. Various operations may include, for example, determining various levels of credit that the customer is qualified for based on customer information stored in the account database such as credit history, income information, account balance information, and the like. In some arrangements, the FI transaction circuit 134 is configured to retrieve content from the content database 138 and identify content stored in the content database 138 applicable to the customer. Identifying applicable content may include, for example, determining a customer membership status, determining an amount of financial rewards that the customer has earned, determine levels of credit that the customer is qualified for, and so on. Identifying applicable content may also include determining table levels of lookup tables associated with various lookup table identifiers that are applicable to the customer.

At 614, an intelligent authorization approval code is generated. In some embodiments, an intelligent authorization approval code is generated using a code-generation scheme such as the code-generation scheme discussed in relation to FIG. 5. In some embodiments, the intelligent authorization approval code includes a first portion that includes various authentication symbols. Authentication symbols may indicate results of the authorization checks performed at 604. For example, if customer address information included in the transaction request matches corresponding information stored in the customer database 136, the first portion may include a particular symbol (e.g., "Y") at a particular position. The first portion may also include additional symbols indicating the results of additional authorization checks (e.g., of CVV numbers included in the authorization request).

In some embodiments, the code generating scheme includes a second portion configured to provide information pertaining to the customer to the merchant computing system 120. In some embodiments, the FI transaction circuit 134 determines the placement of various symbols included in the intelligent authorization approval code based on the identified content in the content database 138 applicable to the customer. For example, a particular symbol position may correspond with various lookup tables associated with various lookup table identifiers such that the value of the symbol located at the particular symbol position indicates a lookup table level applicable to the customer. Accordingly, in some embodiments, the FI transaction circuit 134 is configured to generate an intelligent code including a second information-identifying portion that is ordered such that it can be decoded by the merchant computing system 120.

In some arrangements, the intelligent authorization approval code may include a third transaction-identifying portion. If the same content in the content database 138 is applicable to multiple customers, for example, the FI transaction circuit 134 may be configured to produce intelligent authorization approval codes containing similar first and second portions for multiple authorized customers. Accordingly, for the intelligent authorization approval code to be unique for each transaction, the FI transaction circuit 134 may be configured to add a third, randomly generated portion to the intelligent authorization approval code to make the generated intelligent authorization approval code unique.

At 616, an authorization message is generated and transmitted. In some arrangements, the FI transaction circuit 134 is configured to package the generated intelligent authorization approval code with an approval indication to form the authorization message. The approval indication may contain a set of symbols (e.g., "APP" or "APPROVED") that inform the merchant computing system 120 that the transaction request has been authorized. In some instances, the approval indication contains a set of symbols (e.g., "DCL" or "DECLINED") that inform the merchant computing system 120 that the transaction request is declined or otherwise not authorized. The FI transaction circuit 134 is also configured to transmit the assembled approval message to the payment processor computing system 150 or the merchant computing system 120.

Figure 7:
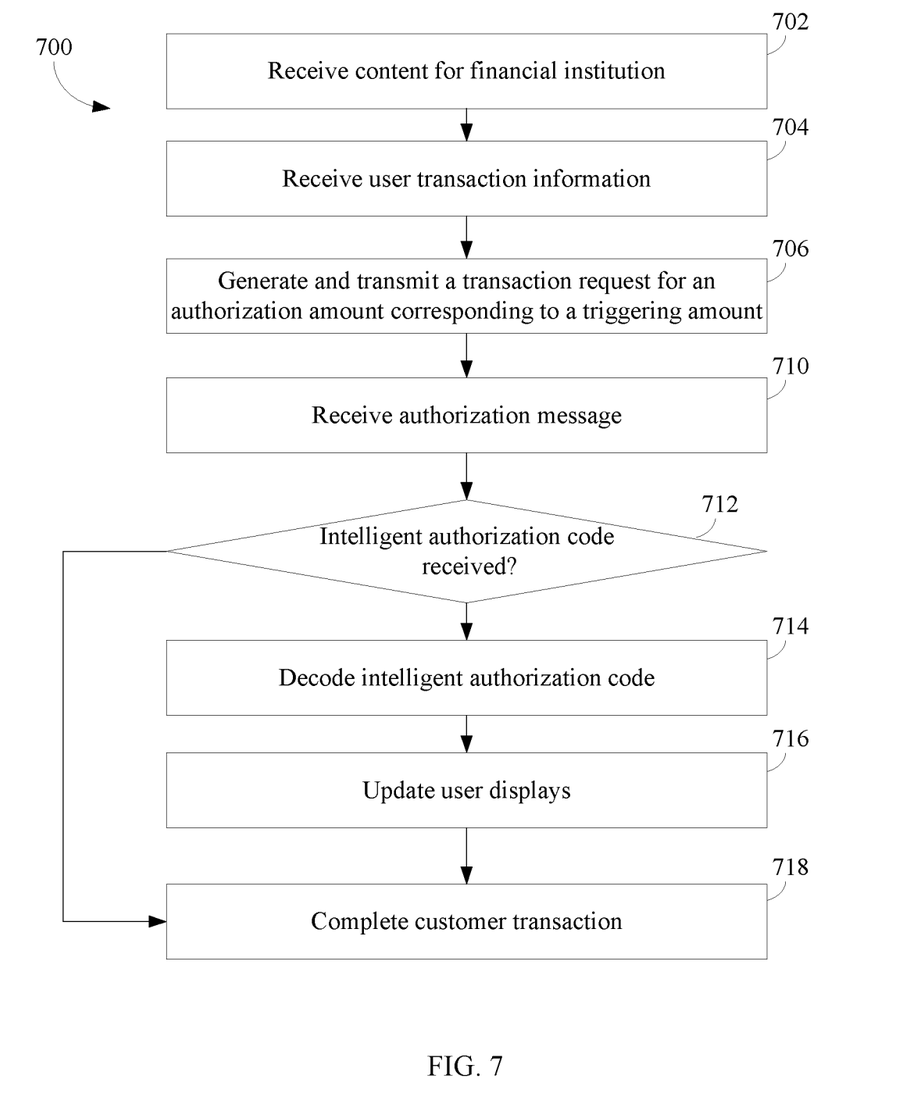
FIG. 7 is a flowchart of a method of using an intelligent authorization approval code to personalize a customer interface, according to an example embodiment.

Referring now to FIG. 7, a flowchart of a method 700 for using an intelligent authorization approval code is shown according to an example embodiment. The method 700 may be performed by processing and storage hardware at a merchant computing system 120 associated with a merchant, as executed by one or more logics comprising one or more software applications configured to perform the functions described below.

At 702, content is received from the financial institution. In some arrangements, the merchant computing system 120 receives information over the network 150 by the merchant network circuit 122 from the financial institution computing system 130. The financial institution computing system 130 may transfer information stored in an associated content database 138 to the merchant computing system 120. As discussed herein, the received information can take a variety of forms. In some arrangements, the information includes a series of lookup tables including information describing various financial characteristics that may or may not be applicable to various customers. In some arrangements, the lookup tables may include web links to web content created or managed by the financial institution. In some arrangements, the web content is configured to present a series of offers to various customers. The offers may be for various products (e.g., loans, reward programs) offered by the financial institution that customers may or may not be pre-approved by the financial institution for. In some arrangements, the offers may include web links that are selectable by customers and are configured to present the customer with an application interface, enabling customers to apply or register for the identified product responsive to a customer selecting the link.

In some arrangements, the information received from the financial institution includes a decoding scheme enabling the merchant computing system 120 to decode intelligent authorization approval codes to determine the information contained in the intelligent authorization approval code. The decoding scheme may include, for example, details concerning the code-generating scheme used by the financial institution computing system 130 to generate intelligent authorization approval codes. To illustrate, the decoding scheme may include information like that presented in FIG. 5, describing relationships between symbol positions in the intelligent authorization approval code and the other information (e.g., lookup tables) received from the financial institution.

At 704, customer transaction information is received. In some arrangements, the customer inputs information into the customer I/O device 116 of the customer computing device 110 while the customer computing device 110 is implementing the merchant client application 114. In some arrangements, the received transaction information includes only customer account information (e.g., a username, password, payment information, and the like) entered by the customer into a login interface presented by the client application. Put differently, in some arrangements, the received transaction information may not identify a product to be purchased by the customer or a transaction amount, but only include account information entered by the customer. For example, in some arrangements, the received transaction information may only include customer login credentials for an account held by the customer at an online marketplace implemented by the merchant computing system 120.

In some arrangements, the received transaction information also includes a product selected by the customer and a transaction amount. For example, the customer may have selected a product via a display presented to the customer on the customer computing device 110 via the merchant client application 114. Upon the customer selecting the product, the customer may be brought to a checkout display on the merchant client application 114 that prompts the customer to input payment information (e.g., account identifying information, address information, and the like). The merchant computing system 120 receives information input by the customer via the network circuit 122.

At 706, a transaction request is generated and transmitted. In some arrangements, the transaction request is generated based on the information received at 704. For example, if the information received at 704 includes customer account information as well as a product selection, the merchant transaction circuit 126 may be configured to determine a total transaction amount for a payment transaction (e.g., total price of specified products and/or services, including sales tax, other fees), bundle the total with the transaction information to make a transaction request, and transmit the transaction request to the payment processor computing system 150 via the merchant network circuit 122. In some arrangements, the generated transaction request may include an authorization amount. The merchant transaction circuit 126 may be configured to generate the authorization amount based on the total transaction amount (e.g., the authorization amount may be an upper transaction limit).

In some arrangements, the merchant transaction circuit 126 is configured to generate a transaction request including a transaction amount that corresponds to a triggering amount. As discussed above, the triggering amount may be a predetermined amount agreed to between the merchant and the financial institution. In some arrangements, the triggering amounts are configured to initiate an intelligent authorization approval code process at the financial institution computing system 130 that will result in the merchant computing system 120 receiving an intelligent authorization approval code. In some arrangements, the financial institution and the merchant may have agreed to set a number of triggering amounts. For example, different triggering amounts may return different types of information regarding the customer (e.g., by referencing different lookup tables). Thus, in some embodiments, the merchant computing system 120 may select the transaction amount based on the type of information regarding the customer that is desired. In some embodiments, the triggering amount is an amount not typical for a transaction (e.g., $0.01, $0.02, or $0.03). In some arrangements, the merchant transaction circuit 126 may be configured to generate a transaction request including an authorization amount that includes the triggering amount closest to the total transaction amount discussed above.

In some arrangements, where, for example, the received transaction information at 704 only includes customer account information (e.g., does not identify a product to be purchased by the customer), the merchant transaction circuit 126 may be configured to generate a transaction request including the customer information as well as an authorization amount that corresponds to the smallest triggering amount agreed to (e.g., one dollar) between the merchant and the financial institution. To illustrate, the merchant transaction circuit 126 may be configured to transmit such an authorization request (e.g., for the minimum triggering amount) responsive to the customer logging into or accessing the merchant client application 114 on the customer computing device 110. The customer may input account credentials (e.g., username and password) into a login display presented by the merchant client application 114. Responsive to the inputting account credentials, the merchant transaction circuit 126 may be configured to retrieve information concerning a payment account of the customer at the financial institution from the merchant database 128. The merchant transaction circuit 126 may use the retrieved information concerning the payment account to assemble a transaction request including the minimum triggering amount to receive an intelligent authorization approval code from the financial institution without the customer even engaging in the transaction. That way, the merchant computing system 120 may receive information concerning the customer through the authorization approval code, and use the received information to update the content viewable by the customer on the merchant client application 114. Thus, each time the customer logs into the merchant client application 114, the content viewable by the customer may be updated to reflect the current financial situation of the customer.

At 710, an authorization message is received. In some arrangements, the financial institution computing system 130 receives the transaction request generated by the merchant computing system 120 at 706 and performs an authorization process such as the method 600 discussed in relation to FIG. 6 to generate and transmit an approval message including intelligent authorization approval code to the merchant computing system 120.

At 712, it is determined whether the received authorization message includes an intelligent authorization approval code. In some arrangements, intelligent authorization approval codes are arranged differently (e.g., include a different sequence of symbols, different groupings of symbols, different types of symbols, and the like) than traditional authorization codes. Accordingly, the merchant transaction circuit 126 may be configured to determine whether the received authorization message includes an intelligent authorization approval code based on the format of the authorization code.

At 714, the intelligent authorization approval code is decoded. In some arrangements, the merchant transaction circuit 126 is configured to decode the received intelligent authorization approval code using the decoding scheme received at 702. The merchant transaction circuit 126 is configured to determine, based on at least one value of at least one symbol in the intelligent authorization approval code, at least a portion of the information received from the financial institution at 702 that is applicable to the customer. In some arrangements, the merchant transaction circuit 126 is configured to identify a lookup table level (e.g., containing financial information, a web link to web content) in a particular lookup table that is applicable to the customer.

At 716, customer displays are updated. In some arrangements, based on the information concerning the customer gained through decoding the intelligent authorization approval code at 714, the merchant transaction circuit 126 may be configured to update the content viewable by the customer on the merchant client application 114 implemented on the customer computing device 110. For example, in some arrangements, the merchant transaction circuit 126 is configured to update information contained in the merchant database 128. Upon gaining information concerning the customer by decoding the intelligent authorization approval code, the merchant transaction circuit 126 may be configured to retrieve the information received at 702 that is applicable to the customer, and transmit that information to the account information associated with the customer stored in the merchant database 128. Further, the data exchange circuit 124 of the merchant computing system 120 may be configured to retrieve the information concerning the customer from the merchant database 128 and update the content viewable by the customer by the merchant client application 114 on the customer computing device 110. Thus, by receiving the intelligent authorization approval code from the financial institution computing system 130, the merchant computing system 120 may update the content viewable by the customer in a way that is personalized to a particular customer.

In some arrangements, where, for example, the information received at 702 includes web content accessible by the merchant computing system 120, the merchant transaction circuit 126 may be configured to identify the web content applicable to the customer based on the received intelligent authorization approval code. Further, the merchant transaction circuit 126 may be further configured retrieve the identified web content (e.g., by accessing content stored in the content database 138 of the financial institution computing system 130) and update the merchant database 128 such that the displays viewable by the customer on the merchant client application 114 of the customer computing device 110 include the retrieved web content.

In some arrangements, where, for example, the information received at 702 includes information that defines a financial profile of the customer (e.g., loan qualifications and the like), the merchant transaction circuit 126 may be configured to transmit information concerning the customer gained through the intelligent approval code to the data exchange circuit 124, which may incorporate that information into certain displays (e.g., a customer account display) viewable by the customer on the merchant client application 114. Thus the customer may be notified of their financial profile as determined by the financial institution computing system 130 without ever leaving the merchant client application 114.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A financial institution computing system, the system comprising:
 a network circuit enabling the financial institution computing system to exchange information over a network;
 a customer database storing financial information for a plurality of customers; and
 a transaction circuit configured to:
  receive, over the network via the network circuit, a transaction request containing authentication information, the transaction request created by a third party computing system associated with a third party, the transaction request specifying an authorization amount, wherein the authorization amount is a trigger amount; and
  identify a customer in the customer database based on the authentication information;
  determine at least one characteristic of the customer based on information of the customer stored in the customer database;
  generate, responsive to the authentication information matching the information of the customer stored in the customer database and the authorization amount being the trigger amount, an intelligent authorization approval code based on the at least one determined characteristic, the intelligent authorization approval code including (i) a first portion indicating the transaction request being either approved or denied and (ii) a second portion encoded with the at least one characteristic of the customer; and
  transmit, over the network via the network circuit to the third party computing system, the intelligent authorization approval code;
 wherein the third party computing system is configured to:
  decode the second portion of the intelligent authorization approval code to identify a hyperlink location of an asset stored in a content database of the financial institution computing system;
  retrieve the asset from the identified hyperlink location;
  generate personalized content for the customer including the retrieved asset, the personalized content including an offer; and
  provide, by a client application, the personalized content including the offer to a customer device of the customer.

2. The financial institution computing system of claim 1, further comprising the content database, the content database storing content, wherein determining the at least one characteristic of the customer includes selecting content from the content database for the customer based on the information of the customer stored in the customer database.

3. The financial institution computing system of claim 2, wherein the transaction circuit is further configured to provide the third party with access to the content stored in the content database.

4. The financial institution computing system of claim 3, wherein providing the third party with access includes transmitting a software application to the third party computing system, the software application configured to communicatively couple the third party computing system with the content database.

5. The financial institution computing system of claim 2, wherein the content stored in the content database includes at least one lookup table identifying a plurality of financial statuses, and wherein selecting content from the content database includes identifying a specific status of the plurality of financial statuses for the customer based on the information of the customer stored in the customer database.

6. The financial institution computing system of claim 5, wherein the plurality of financial statuses identify at least one of the following: a home loan qualification status, a line of credit status, and a customer membership status.

7. The financial institution computing system of claim 2, wherein the content stored in the content database includes web content displayable to the customer via a web browser.

8. The financial institution computing system of claim 1, wherein the transaction circuit is further configured to:
 receive, over the network by the network circuit, an information request from the third party computing system; and
 transmit, over the network by the network circuit, responsive to receiving the information request, information to the third party computing system, the information describing a plurality of financial statuses.

9. The financial institution computing system of claim 8, wherein determining the at least one characteristic of the customer includes selecting a specific status from the plurality of financial statuses described by the transmitted information for the customer based on the information of the customer stored in the customer database.

10. The financial institution computing system of claim 1, wherein the first portion includes at least one symbol indicating that the authentication information included in the transaction request corresponds to the information of the customer stored in the customer database, the second portion containing at least one symbol associated with the determined characteristic.

11. The financial institution computing system of claim 10, wherein the second portion includes a sequence of a predetermined number of symbols, each symbol in the sequence having a sequence position associated therewith, wherein each sequence position corresponds to a different attribute of the customer.

12. The financial institution computing system of claim 1, wherein the at least one characteristic of the customer is a level of credit of the customer, and wherein the offer is made in a price range that the level of credit covers.

13. The financial institution computing system of claim 12, wherein the personalized content provided to the customer device informs the customer that the customer has enough credit to accept the offer.

14. A method for pre-authorizing a transaction request, the method comprising:
 receiving, over a network via a network circuit of a financial institution computing system associated with a financial institution, a transaction request containing authentication information, the transaction request created by a third party computing system associated with a third party, the transaction request specifying an authorization amount, wherein the authorization amount is a trigger amount not typical for a financial transaction;

identifying a customer in a customer database based on the authentication information;

determining at least one characteristic of the customer based on information of the customer stored in the customer database, the at least one characteristic including at least one of (i) a loan qualification amount, (ii) a home equity line of credit period, or (iii) a customer membership status;

generating, responsive to the authentication information matching the information of the customer stored in the customer database and the authorization amount being the trigger amount, an intelligent authorization approval code based on the determined at least one characteristic, the intelligent authorization approval code indicative of the transaction request being pre-approved and including information encoding the at least one of (i) the loan qualification amount, (ii) the home equity line of credit period, or (iii) the customer membership status; and transmitting, by a transaction circuit, over the network via the network circuit to the third party computing system, the intelligent authorization approval code;

wherein the third party computing system is configured to:

decode the intelligent authorization approval code to retrieve the at least one of (i) the loan qualification amount, (ii) the home equity line of credit period, or (iii) the customer membership status;

retrieve an asset from a hyperlink location associated with the decoded at least one of (i) the loan qualification amount, (ii) the home equity line of credit period, or (iii) the customer membership status;

generate personalized content for the customer based on the retrieved asset, the personalized content including an offer; and     provide, by a client application, the personalized content including the offer to a customer device of the customer.

15. The method of claim 14, wherein determining the at least one characteristic of the customer includes selecting content from a content database for the customer based on the information of the customer stored in the customer database.

16. The method of claim 14, wherein the third party computing system is a merchant computing system, and wherein the transaction circuit is further configured to:

receive, over the network by the network circuit, an information request from the merchant computing system; and     transmit, over the network by the network circuit, responsive to receiving the information request, information to the merchant computing system, the information describing a plurality of financial statuses.

17. The method of claim 16, wherein determining the at least one characteristic of the customer includes selecting a specific status from the plurality of financial statuses described by the transmitted information for the customer based on the information of the customer stored in the customer database.

\* \* \* \* \*